(12) United States Patent
Golben

(10) Patent No.: US 6,508,866 B1
(45) Date of Patent: Jan. 21, 2003

(54) PASSIVE PURIFICATION IN METAL HYDRIDE STORAGE APPARATUS

(75) Inventor: P. Mark Golben, Florida, NY (US)

(73) Assignee: Ergenics, Inc., Ringwood, NJ (US)

( * ) Notice: Subject to any disclaimer, the term of this patent is extended or adjusted under 35 U.S.C. 154(b) by 0 days.

(21) Appl. No.: 09/908,098

(22) Filed: Jul. 18, 2001

Related U.S. Application Data
(60) Provisional application No. 60/219,188, filed on Jul. 19, 2000.

(51) Int. Cl.$^7$ ............................ B01D 53/04; F17C 11/00
(52) U.S. Cl. .......................... 96/146; 96/153; 420/900; 62/46.2; 62/467
(58) Field of Search ............................ 96/108, 112, 146, 96/153; 95/117; 420/900; 252/181.2, 194; 62/46.2, 467; 123/DIG. 12; 423/248; 206/0.7

(56) References Cited

U.S. PATENT DOCUMENTS

| | | | | |
|---|---|---|---|---|
| 4,157,958 A | * | 6/1979 | Chow | 210/170 |
| 4,343,770 A | * | 8/1982 | Simons | 123/DIG. 12 |
| 4,402,187 A | | 9/1983 | Golben et al. | |
| 4,405,487 A | * | 9/1983 | Harrah et al. | 252/181.2 |
| 4,505,120 A | | 3/1985 | Golben | |
| 4,716,736 A | * | 1/1988 | Schwarz | |
| 4,769,225 A | * | 9/1988 | Reilly et al. | 420/900 |
| 4,781,246 A | | 11/1988 | Golben | |
| 5,250,368 A | | 10/1993 | Golben et al. | |
| 5,365,742 A | * | 11/1994 | Boffito et al. | 252/181.5 |
| 5,450,721 A | | 9/1995 | Golben et al. | |
| 5,532,074 A | | 7/1996 | Golben | |
| 5,623,987 A | | 4/1997 | Golben et al. | |
| 5,673,556 A | | 10/1997 | Golben et al. | |
| 5,688,611 A | | 11/1997 | Golben | |
| 6,042,960 A | | 3/2000 | DaCosta et al. | |

FOREIGN PATENT DOCUMENTS

JP    411185745 A   *   7/1999

* cited by examiner

*Primary Examiner*—David A. Simmons
*Assistant Examiner*—Frank M. Lawrence
(74) *Attorney, Agent, or Firm*—Vangelis Economou; Ladas & Parry

(57) ABSTRACT

Heat exchangers, hydrogen gas compressors, hydrogen gas storage devices, hydrogen gas purifiers and metal hydride air conditioners utilizing a flow of a hydrogen gas stream which is absorbed and desorbed by a metal hydride causes disproportionation and "poisoning" of the metal hydrides by introduction of impurities such as water vapor, oxygen and carbon monoxide. Use of a noble metal in powder form, when introduced in the metal hydride particles has been found to act as a catalyst and to delay absorption of the impurities in the metal hydride, and further permits the more efficient and longer use of such devices by inhibiting the undesirable disproportionation and poisoning. In another embodiment, a vent is provided in the initial stage of a hydrogen compressor to vent out the impurities before these result in decreasing efficiency of the devices due to disproportionation, poisoning and increased vapor pressure.

11 Claims, 3 Drawing Sheets

PASSIVE PURIFICATION IN METAL HYDRIDE STORAGE APPARATUS

This application claims the benefit of U.S. Provisional Application No. 60/219,188, filed Jul. 19, 2000.

BACKGROUND OF THE INVENTION

1. Field of the Invention

This invention relates generally to apparatus using metal hydrides as a means to store and operate with hydrogen, and, more specifically, to the use of such hydrogen and in operation in which the hydrogen gas is purified during storage or operation.

2. Background Art

Inexpensive but essentially pure sources and storage of hydrogen gas ($H_2$) is increasingly important to the production of energy as economic and environmental factors compels a shift away from dirty petrochemical fuels. Unless efforts are made to retain the purity of hydrogen gas, impurities, such as oxygen, water vapor and carbon monoxide, inevitably become entrained within a stream of hydrogen gas. These impurities impede the operation and/or efficiency of any device which stores the hydrogen gas, or which utilizes the hydrogen gas in its operation.

Purification of a hydrogen gas stream was an elaborate procedure that, in most cases, involved a net energy input into the hydrogen utilization system. For example, commonly assigned U.S. Pat. No. 5,250,368, drawn to a metal hydride battery and metal hydride hydrogen storage system, teaches a combination molecular sieve dryer and electrical resistance heating wire to remove water vapor when the hydrogen stream is directed in one direction, and by heating, re-introduces the water vapor back into the hydrogen stream when it is directed in the opposite direction. This system is capable of inhibiting entry of the water vapor into the hydrogen storage chamber, where it can cause the metal hydride hydrogen storage material to deteriorate and lose storage capacity.

Later modifications of such systems that purified hydrogen when passing in a stream from one part of a metal hydride battery system to another part included a passive hydrogen purification for hydrogen gas delivery, for example, as described in commonly assigned U.S. Pat. No. 5,688,611. In the metal hydride battery described in that patent, a formulation of a metal hydride material is dispersed within a matrix of a silica gel powder. The silica gel powder provides for absorption of water vapor before the hydrogen is absorbed in the metal hydride. The metal hydride storage medium itself may include corrosion resistant elements, and an optional surface film which is water vapor and carbon-oxide repellant. Such a film is taught in commonly assigned U.S. Pat. No. 5,532,074.

Other modifications to such metal hydride battery systems are taught in commonly assigned U.S. Pat. No. 4,781,246, drawn to a thermally reversible heat exchange unit for use in any of a number of devices utilizing the cycling of hydrogen gas in a heat transfer or hydrogen storage operations. Examples of the apparatus or systems in which heat exchange units described in U.S. Pat. No. 4,781,246 may be utilized are refrigerators, heat pumps, air conditioners, compressors and hydrogen storage devices, including hydrogen purifiers. All of these systems require an efficient method to isolate the water vapor from the metal hydride storage medium.

An automatic system is taught in commonly assigned U.S. Pat. No. 6,042,960 which inhibits transfer of water vapor in the absence of the pressurized flow of hydrogen in the context of a battery system.

Hydrogen gas streams utilized in other than metal hydride battery systems require modifications to these systems toward providing greater efficiencies. For example, in commonly assigned U.S. Pat. Nos. 5,450,721 and 5,623,987, an air conditioning system, and a modular manifold hydrogen gas delivery system are described and claimed. Those systems utilize the different hydrogen absorption characteristics of specified metal hydride alloys to provide a sudden heat energy transfer from or to a desired location. Because the system is closed, and does not introduce new hydrogen gas or other elements into the system which can affect the sorption characteristics of the metal hydrides therein, thus a filter for removing water vapor and other gas impurities was not considered necessary. However, it is now known that even in "hermetically sealed" systems, gaseous impurities may be introduced at the initial start-up and may even enter into such a system during operations conducted at high pressures or from outgassing from the internal wall surfaces and cracks, or from diffusion through the walls.

When a repeating cycle of hydrogen absorption and desorption is used in a heat exchange cycle, impurities in the gas stream can result in the deterioration of hydriding capacity. Hydrogen absorption in a metal hydride alloy as used in heat exchange units is accompanied by a heat of formation which is exothermic. In order to continuously absorb hydrogen to an alloy's maximum capacity, heat must be removed from the bed. The rate at which a hydride alloy can absorb or release hydrogen is dependent upon the rate at which heat can be transferred into or out of the alloy. Increasing the heat transfer rate will allow the processing of higher flow rates, or alternatively, the same flow rate can be processed by a proportionately smaller amount of alloy. Therefore, small containers capable of rapid heat transfer can handle high flow rates.

With each thermal cycle, the metal hydride alloy in a container is first filled to capacity and then emptied. Gaseous impurities can react with the hydride alloy causing a reduction in its hydrogen storage capacity and may inhibit the further absorption of hydrogen gas. The net result causes a decline in hydrogen throughput with each thermal cycle. For this reason, thermal compression of hydrogen using metal hydrides has been restricted to relatively pure hydrogen streams (99.995%) that have less than 50 ppm of active gas impurities. Although hydrogen purification systems can be used to remove impurities, the purification systems themselves are often complex, expensive to maintain, and, for hydrogen produced at atmospheric pressure, would require their own motive force in the form of a mechanical compressor or blower. These disadvantages offset benefits that could be derived from thermal compression.

The need for a filter to remove gaseous impurities from a hydrogen gas stream has been found in a variety of applications. Many of the applications in which such filters are utilizable differ in essential respects from the applications in which such filters have been utilized heretofore. For example, an application in which metal hydride combinations re utilized to compress hydrogen gas is described in commonly assigned U.S. Pat. Nos. 4,402,187 and 4,505,120. One major difference is that a hydrogen gas stream enters the compressor at an inlet and exits at an outlet at much higher pressure. The continual addition of new hydrogen into such a system introduces a continua stream of impurities that are entrained in the hydrogen. Although most hydrogen compression systems are capable of self-cleansing of a certain amount of impurities in the hydrogen gas stream, the continual addition without a purge of the impurities can overwhelm a system so that it becomes non-operational. Other applications of hydrogen gas also utilize a purification device, as will be more fully described in the detailed description below. To avoid unnecessary repetition, the description and teachings of the above mentioned commonly assigned U.S. Pat. Nos. 4,402,187; 5,450,721; 4,505,120; 4,781,246; 5,250,368; 5,532,074; 5,623,987; 5,688,611 and 6,042,960 are each incorporated herein by reference where appropriate as if fully set forth herein, for purposes of enablement of this application. A need in the operational transfer function of a hydrogen gas stream exists for removing impurities in applications beyond those heretofore known. A need is also apparent for a purification device for a hydrogen gas stream that is capable of removing not only water vapor, but also minute quantities of other types of gas impurities, such as oxygen ($O_2$), carbon monoxide (CO) and carbon dioxide ($CO_2$).

SUMMARY OF THE INVENTION

Accordingly, what is disclosed and claimed herein is a passive purification device that is usable within a hydrogen gas transport stream, preferably in line with a conduit, that is standard for a number of hydrogen gas storage and utilization applications.

In one embodiment, such a passive purification device in a thermal hydrogen compressor may comprise a metal hydride material for retaining and storing a concentrated volume of hydrogen gas, that material being capable of repeatedly absorbing and discharging gaseous hydrogen, the material comprising a mixture of water vapor absorbing particles, metal hydride particles and a noble metal in powder form. The material may further comprise a metallic powder selected from the group consisting of: Platinum black, Palladium black and Ruthenium black. In a second embodiment, a hydrogen compressor comprising an inlet for hydrogen gas fed at a low inlet pressure and an outlet for hydrogen gas at high pressure, therebetween at least two sets of connected units A, C and E and at least two sets of units serving the unit functions B, D and F said A through F being a first chamber in communication with said inlet through a one-way valve adapted to admit hydrogen gas into said first chamber at said low inlet pressure containing a first hydridable material having an adsorption pressure below said low inlet pressure at a first temperature, heat exchange means associated with said first chamber adapted to operate alternately to maintain said first chamber at or below said first temperature and to raise the temperature of said first chamber to a second temperature higher than said first temperature, a second chamber in communication with said first chamber through a one-way valve adapted to prevent flow of hydrogen from said second chamber to said first chamber and containing a second hydridable material forming a less stable hydride than said first hydridable material and having a plateau pressure at a temperature below said second temperature less than the plateau pressure of said first hydridable material at said second temperature, heat exchange means associated with said second chamber adapted to operate alternately to maintain said second chamber at a temperature lower than said second temperature and at a third temperature higher than said first temperature, a third chamber in communication with said second chamber through a one-way valve adapted to prevent flow of hydrogen from said third chamber to said second chamber and in communication with said outlet and containing a third hydridable material forming a less stable hydride the said second hydridable material having a plateau pressure at a temperature below said third temperature less than the plateau pressure of said second hydridable material at said third temperature, heat exchange means associated with said third chamber adapted to operate alternately to maintain said third chamber at a temperature lower than said third temperature and at a fourth temperature higher than said first temperature and control means for alternating the temperature capacity of heat exchange means B, D and F to maintain the lower of the two specified temperatures when hydrogen is being absorbed by the hydridable material in the associated chambers and at the higher of the two specified temperatures when hydrogen is present in and being desorbed from the hydridable material in the associated chambers, and said first chamber further including a hydrogen vent that is controlled by said control means for venting hydrogen gas from said first chamber at predetermined intervals and for a predetermined amount of time.

BRIEF DESCRIPTION OF THE DRAWING FIGURES

DETAILED DESCRIPTION OF THE PREFERRED EMBODIMENTS

Figure 1:
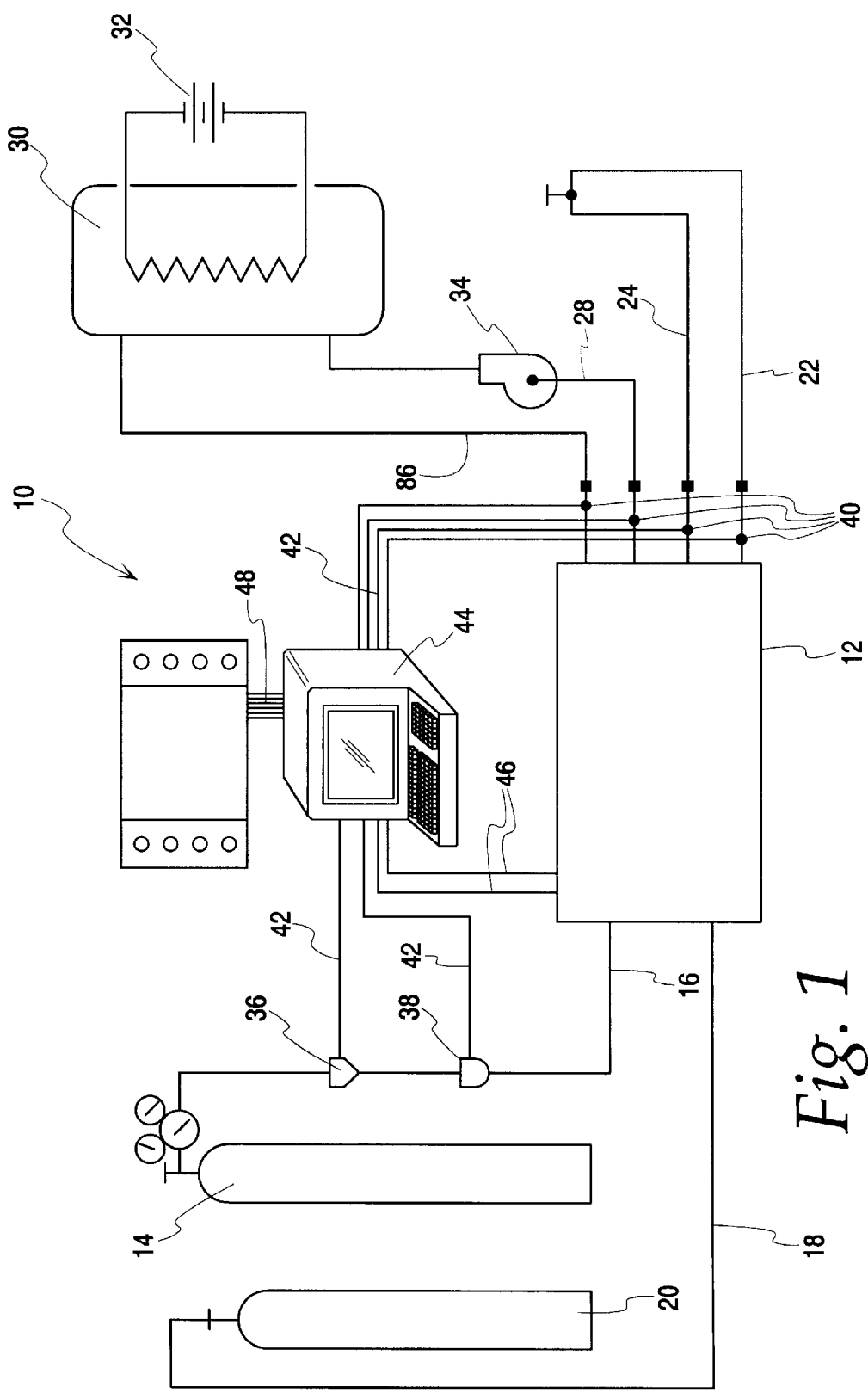
FIG. 1 is a prior art system schematic diagram of a hydrogen compressor.

Referring now to FIG. 1, a hydrogen gas compressor 10 is schematically illustrated, comprising a known hydrogen gas heat exchanger unit 12, connected to a low pressure hydrogen gas source 14 through an inlet pipe 16 and through an outlet pipe 18 to a high pressure hydrogen gas storage receptacle 20. Hydrogen source 14 and receptacle 18 may comprise conventional regulated gas tanks suitable for safely transporting and offering for commercial sale the high-pressure hydrogen.

The hydrogen heat exchange units 12 comprise known hydrogen compressors, such as the one shown in FIG. 1 and include an inlet 22 and outlet 24 for a cold water stream, and an inlet 26 and outlet 28 for a hot water stream. The apparatus 10 provides for heating of the hot water by any appropriate means, such as an electrical resistance heater 30 energized by an electrical source 32, or by a gas burner, as shall be explained below with reference to the inventive embodiments. The hot water inlet 26, outlet 28 and heater 30 may comprise a closed hot water loop which circulates the hot water by means of a pump 34.

The hydrogen compressor apparatus 10 may include optional sensing equipment, such as a hydrogen mass flow meter 36, a pressure transducer 38 and thermocouple temperature sensors 40 electrically connected to various portions of the system by means of leads 42 and communicating with a central processing unit (CPU) 44. The CPU 44 further includes plural connections 46 to the heat exchanger units 12 for providing control functions to the various elements comprising the heat exchange units 12, as will be explained below with reference to the inventive embodiments.

Optional connections 48 from the CPU 44 to a printer or stripchart recorder 50 may be utilized to maintain a permanent record of the operation of the hydrogen compressor system 10, which may be a conventional operation as disclosed and taught in the aforementioned U.S. Pat. Nos. 4,402,187 and 4,505,120.

Figure 2:
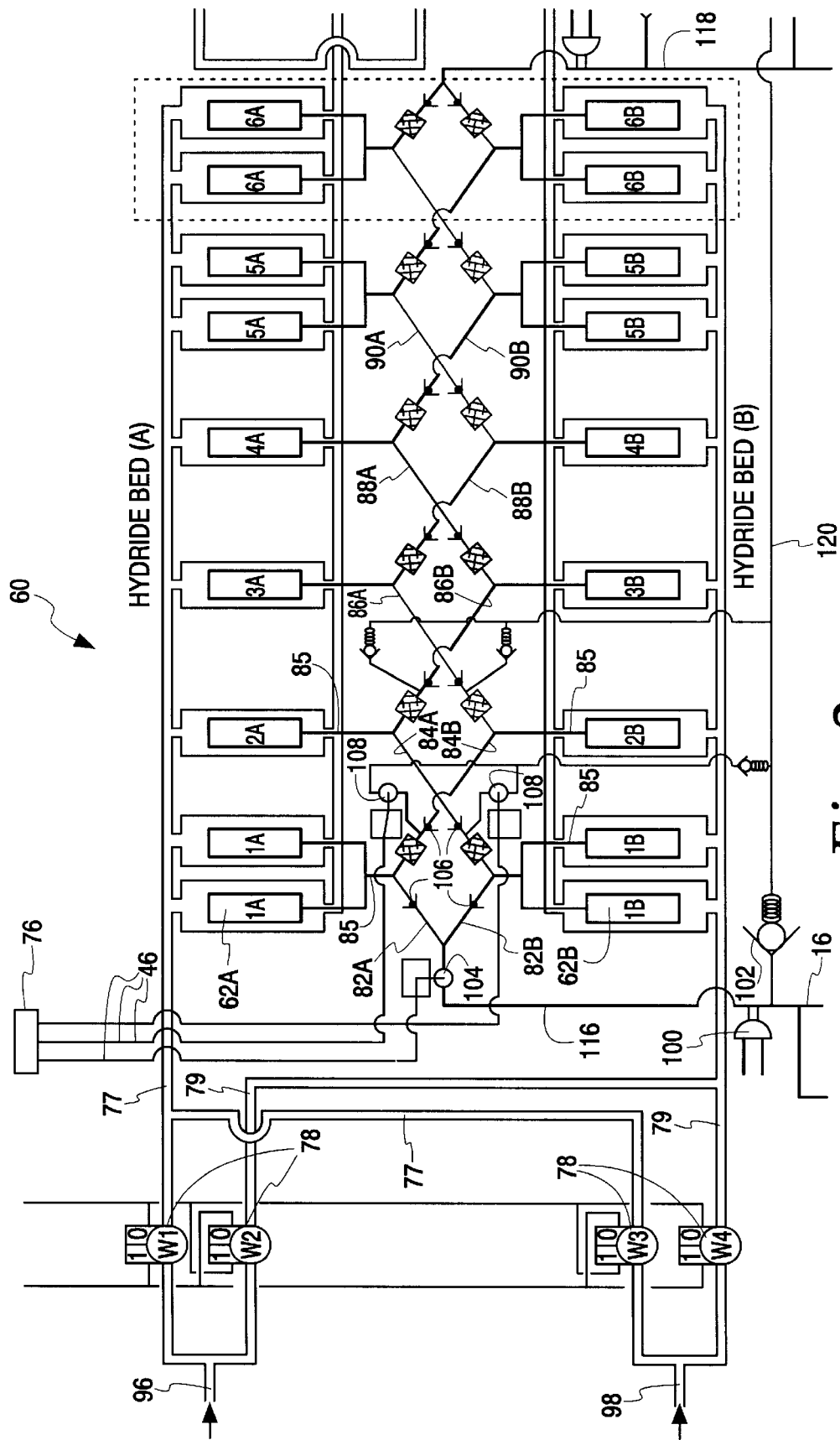
FIG. 2 illustrates in a schematic diagram the configuration of a thermal hydrogen compressor utilizing the hydrogen purification device according to this invention.

The inventive embodiments of an improved hydrogen gas thermal compressor apparatus 60 is shown in FIG. 2. The improvements provide a number of benefits, which include not only the compression of hydrogen gas, for example, by a tenfold increase in hydrogen gas pressure, but also a purification of the hydrogen gas to over 99.99% pure hydrogen. These benefits derive from utilizing the invention described and claimed herein, resulting in more efficient, less expensive operation for providing an economical and commercially viable source of pure hydrogen gas at high pressure.

Referring now to FIG. 2, a hydrogen compressor system 60 according to the present invention, the structure of an inventive hydrogen gas compressor, utilizing the present invention, is described relative to its principles of operation. A thermal compressor system 60, as shown in FIG. 2, comprises three essential subsystems. A first subsystem comprises at least two sets of hydride beds, an A set, namely 62A, 64A, 66A, 68A and 70A, and a B set, namely 62B, 64B, 66B, 68B and 70B, including piping between them, as will be described below. Another essential subsystem is the hot and cold water circulation subsystems 72, 74, and the control subsystem CPU 76 shown in FIG. 2. Each of these known subsystems will be briefly described in greater detail below, but for a fuller, more elaborate description of the hydride heat exchange units, reference is made to the teaching of the aforementioned U.S. Pat. Nos. 4,402,187 and 4,505,120.

Each similarly numbered hydride bed pair, for example, hydride bed containers 62A, 62B and connecting pipes 82A, 82B comprise a heat exchange unit 62; and similarly the remaining hydride bed container pairs 64A, 64B together with pipes 84A, 84B comprise a second hydride heat exchange unit, and so on. The piping 82A, 82B, 84A, 84B etc. is interconnected, as will be described below. The first set of pipes 82A, 82B is connected to the hydrogen inlet 16 (FIG. 1) by means of the internal inlet pipe 116. Inlet pipe 116 has disposed along it a low pressure switch 100 and a safety pressure, relief valve 102. The low pressure switch 100 will close off the inlet if pressure goes below a certain valve, i.e., 15 p.s.i. and the pressure relief switch 102 will release incoming hydrogen gas if it exceeds a predetermined pressure value, e.g. 200 p.s.i.a. Exposure of the piping 16, 116 to pressures below atmospheric pressure are to be avoided in that a negative pressure will lead to undesirably attract gaseous impurities from the ambient environment into the system 60. Likewise, if for some accidental reason the hydrogen gas pressure within the inlet pipe exceeds a safe or expected pressure, the pressure relieve valve will vent the hydrogen to a vent stack for the processing, as will be described below.

Further along the inlet pipe 116, there is disposed a hydrogen cut off valve 104 such as a solenoid valve, which is controlled by the CPU 76 through electrical control connections 46 (FIG. 1). The valve 104 opens and closes in accordance with the cycle timing of the remainder of the system 60 to introduce an additional aliquot of hydrogen gas into the system for compression, which provides for continual additions of hydrogen gas, thus supplying product to be throughput into the compressor 10.

The above description of the hydrogen compressor system 60 is mostly conventional. Within each of the piping 82A, 82B, each connected to the inlet pipe 11 6, is a one-way check valve 106, that opens only when the hydrogen gas pressure on the side of inlet pipe 116 is greater than that of the piping 82A, 82B. Thus, as the hydrogen is delivered downstream, i.e., from heat exchange unit 62 toward unit 64 and on wards, the pressure of the hydrogen within the first heat exchange unit 62 will fall below the normal gas pressure present in the inlet pipe 116. For the most part, each hydride bed pair 64A, 64B; 66A, 66B; 68A, 68B, etc. has as a hydrogen source the immediately adjacent upstream bed, and a connection provided by, for example, hydrogen inlet pipes 82A, 82B; 84A, 84B; etc. The inlet pipes 82A, 82B provide a path for the hydrogen 85 to the hydride bed within each of the containers, 64A, 64B, 66A, 66B, etc. As the cold water and hot water are cycled from one series of beds, e.g., from the A series to the B series, the hydrogen is compressed at each stage until it reaches the internal outlet pipe 118, connected to outlet pipe 18 (FIG. 1). The process of hydrogen gas compression is described in aforementioned U.S. Pat. Nos. 4,402,187 and 4,505,120, incorporated by reference, and review of those patents and others set forth above is recommended for a more detailed description.

An optional feature utilizable in the embodiment of hydrogen compressor 60 shown in FIG. 2 is a hydrogen 108 vent, the opening and closing of which is controlled by the CPU 76, through an electrical connection 110 extending there between. The timing of the opening and closing of hydrogen vents 108 is most conveniently and efficiently done during the periods immediately prior to the switch over of the hot and cold water streams, that is, at the time that the bed which was in contact with the cold water is switched to hot water. At this time, the hydrogen absorption/desorption occurring in the first two metal hydride beds 62A, 62B, approaches equilibrium, and so the hydrogen pressure of the pipes 82A, 82B is not at a maximum. Venting is directed by the controller CPU 76 as it receives a signal of the pressure differential within the piping 82A, 82B. The CPU signals the hydrogen vents 108 which is opened for at most one to two seconds. Any impurities entrained within the hydrogen gas, pressurized at about 30–40 p.s.i., are ejected into the exit vent pipe 114, which connects to a central vent stack 120. Vent stack itself may be connected to a disposal site for the "impulse" hydrogen gas, where it may be burned off, for example, in a hot water heater for providing otherwise waste heat for the useful purpose of heating the hot water utilized in the compressor 60.

In the period when the maximum hydrogen is absorbed in the metal hydride beds 62A, 62B, the hydrogen therein is almost pure, whereas the hydrogen in the piping 82A, 82B is relatively impure. Makeup hydrogen is available from the source 14, and in expelling the "impure" hydrogen gas during each throughput cycle, a larger relative proportion of the impurity gases is expelled than of the hydrogen gas within the system. That is, after the vents 108 are closed and the hydrogen gas is desorbed, the remaining hydrogen in pipes 82A, 82B includes fewer impurities than before the venting process because the makeup hydrogen in the next aliquot received from the source 14 will have relatively less impurities than the hydrogen gas vented through vents 108. As the venting process occurs during every cycle, or $V_2$ cycle, if desired, impurity gases do not build up in the system and ultimate saturation of the desiccant material is avoided.

In systems where ultra pure hydrogen gas may be desired, for example, in a hydrogen purifier device, more than one vent cycle may be utilized, beyond the vents 108, shown in FIG. 1. For example, vents (not shown) may be inserted in pipes 84A, 84B, and may be controlled by the CPU 44 to vent a second aliquot of hydrogen gas that may have included some minor level of impurities. The vented hydrogen gas does not necessarily translate into waste, however, because of the transformation of hydrogen gas that may have impurities to a pure hydrogen gas stream, which is more valuable commercially than wet or impure hydrogen. Moreover, burning of vented hydrogen in a stack to heat water or for other use, for example, in the device 60, also produces a fuel savings and provides to the system, a self-generating energy source.

In the thermal compressor 60, hydrogen gas is absorbed in a reversible metal hydride alloy in the hydride bed 62A at low pressure in a water-cooled container. The container is subsequently heated with hot water which releases the hydrogen gas at a higher pressure.

Continuous compression is achieved with two identical containers in a parallel configuration; one container cooled by water absorbs hydrogen while the other is heated with hot water to release hydrogen at the same rate. The cool and hot water streams in pipes are periodically switched by ball valve switches 78 so that water flowing through one set of pipes 77 switches to the other set of pipes 79, and vice versa and the simple check valves 106 keep hydrogen gas moving through the compressor. In a second embodiment, hydrogen gas purification is a feature which may be used in any of a number of applications, such as ring manifold type heat exchangers, as described in aforementioned U.S. Pat. No. 5,623,987, in air conditioners utilizing metal hydrides, described in U.S. Pat. No. 5,450,721, and in other heat exchange devices, such as described in U.S. Pat. No. 4,781, 246, used in refrigerators, heat pumps, and low pressure hydrogen storage devices.

This improvement comprises in the use of an additive to the metal hydride material that includes both a powder desiccant and a corrosion resistant additive to the metal hydride material. Although such additives are taught in aforementioned U.S. Pat. No. 5,688,611, the additives have not been in apparatus such as those described above, such as in hydrogen gas purifiers, refrigeration systems, air conditioners, and hydrogen storage systems. It has been determined that adding desiccant and using a corrosion resistant metal hydride alloys increases the capability of these apparatus to utilize hydrogen that cannot be guaranteed pure, and thus greatly increasing the cost-effectiveness of the operation of these types of systems. Even when utilized in closed systems, where the same hydrogen is cycled between a storage metal hydride bed and a device which utilizes the hydrogen gas for its operation or between two or more separate hydride beds, as in the case of a hydrogen compressor, it has been noted that impurities such as oxygen, carbon monoxide, carbon dioxide, water vapor, and even inert gas impurities, such as nitrogen, ammonia, helium and argon, find their ways into the closed system. Once removed from the hydrogen, these impurities can be either permanently stored within the desiccant material, or may be vented as in the case of the hydrogen compressor device described above.

In yet another embodiment, the additives can also be utilized within the desiccant material that cause even inert gaseous impurities to combine with other elements so as to form a compound that is absorbable by the desiccant additive. It has been found that adding some small amount, less than one percent (1%) of a noble or similar metal, such as platinum or palladium, causes otherwise relatively inert gaseous impurities to be catalyzed and recombine to form a desiccant absorbable gas. For example, beneficial use has been found in a powdered form of a platinum black or palladium black, when completely mixed in with the metal hydride and desiccant material taught in aforementioned U.S. Pat. No. 5,688,611. The powdered catalyst powder acts to dissociate, for example, an oxygen molecule ($O_2$) to its constituent atoms and then to combine with the hydrogen in the system to form a water molecule. Similarly, a nitrogen molecule ($N_2$) may be catalyzed at high heats to form ammonia since both oxygen and nitrogen impurities would be harmful to the operation of the metal hydride material, catalytic formation of water or ammonia are beneficial because these impurities are absorbed by the desiccant material. Thus, one embodiment of this invention encompasses the use of a noble metal in powder form to act as a catalyst. This improved additive material can be utilized together with any metal hydride material, whether utilized in compressors, air conditioners, hydrogen gas purifiers, and other apparatus utilizing repeated metal hydride absorption/desorption cycling.

Figure 3:
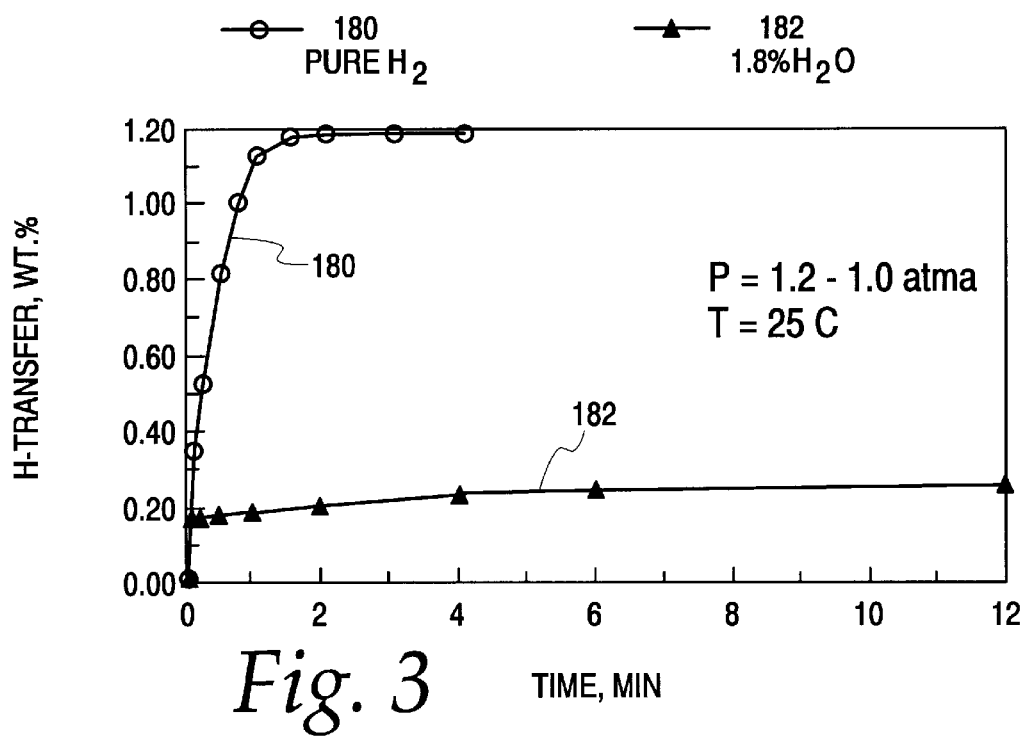
FIG. 3 is a graph showing the effects of hydride cycling using a dry hydrogen gas stream against a wet hydrogen gas stream.
Figure 4:
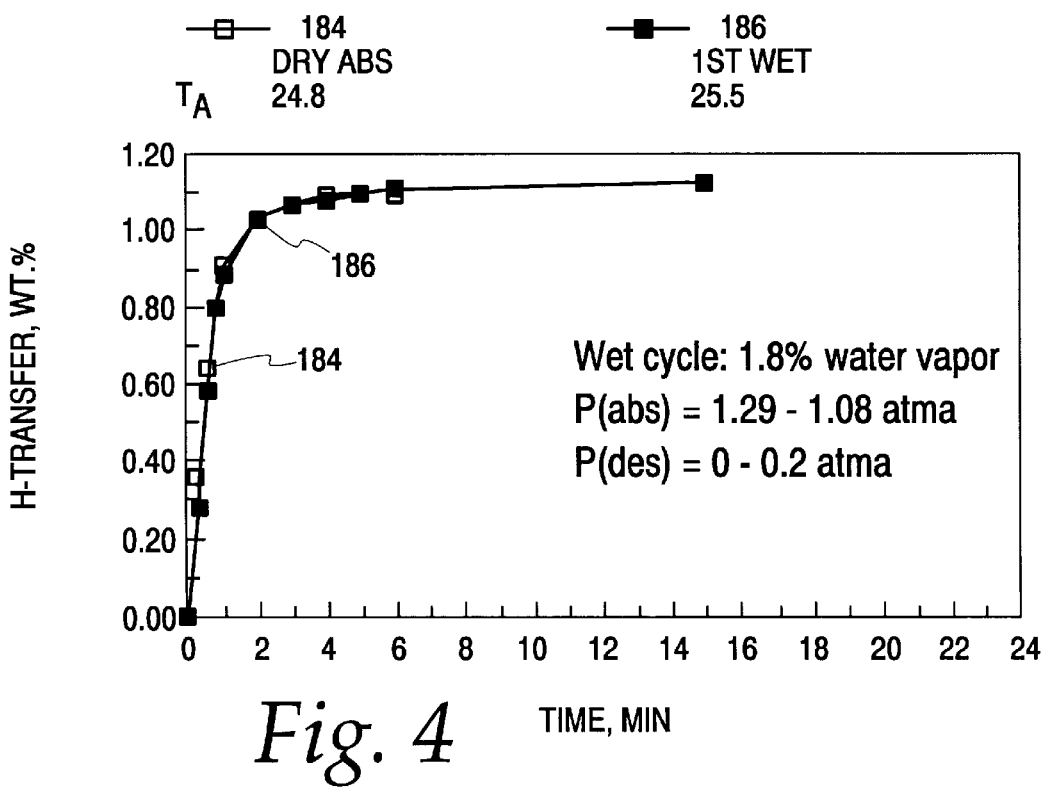
FIG. 4 illustrates in graphical form the effects of hydride cycling and the difference between dry hydrogen and wet hydrogen passing through a device according to this invention.

Referring now to FIGS. 3 and 4, the efficacy of utilizing a catalyst comprising a noble metal powder is shown. FIG. 3 shows the Hydrogen gas heat transfer rate as a function of time, in two separate instances, one in which the hydrogen gas is essentially pure Hydrogen and a second in which the hydrogen gas is completely saturated in water vapor, i.e. 1.8% by weight $H_2O$. As can be seen from the graph line 180, the pure hydrogen gas is immediately absorbed by the metal hydride, and after 2 minutes, reaches an equilibrium point where the hydrogen pressure in the chamber and the amount of absorbed hydrogen remain relatively constant.

On the other hand, the water vapor laden hydrogen gas also has a marked absorption, but this lasts for only about 10 seconds. Soon thereafter, there is a gradual increase in the amount of hydrogen absorbed, confirming the theory that the water vapor acts at the surface of the metal hydride to inhibit additional hydrogen absorption.

Referring now to FIG. 4, a hydrogen gas stream of pure hydrogen is absorbed by a mixture of metal hydride, a water absorbing material, such as desiccant, and a metal powder of a noble metal. Alternatively, the noble metal may be melted into the metal hydride alloy so as to form a thin surface film, thereby providing the catalytic operation before the hydrogen is absorbed within the metal hydride material.

As can be seen by the graph line 184 in FIG. 4, the pure hydrogen gas is absorbed to an equilibrium very quickly, with 95% of the gas being absorbed within the first two minutes. As can be seen from the valves, where graph line 184 levels off, there is slightly less, about 10% less, hydrogen absorbed by weight percent in the weight of hydrogen relative to the absorption material mixture. This is attributable to the added weight of the desiccant and noble metal, about 3% by weight. 1% by weight of the total weight of the absorbing material. Neither the desiccant nor the noble metal are absorbers of hydrogen gas, and so there is relatively less hydrogen absorbed when measured against the total weight of the absorbing mixture.

The efficacy of using the noble metal additive, together with the desiccant and metal hydride mixture is shown by graph line 186, representing the hydrogen absorption of a water saturated hydrogen gas. As can be readily seen by the coincidence of graph lines 184 and 186, the water vapor fails to inhibit absorption of the hydrogen gas by the metal hydride, which hydrogen gas is absorbed as quickly by the metal hydride as if the water vapor were not present in the hydrogen. It is evident that the water vapor is absorbed in the desiccant, and any dissociated oxygen molecules are effectively catalyzed to reform as water molecules by the noble metal catalyst. Thus free, dissociated oxygen molecules which may result from water molecules.

The addition of water absorbing desiccant restores the absorption kinetics, but capacity degrades as a result of poisoning, whether by water vapor disassociating into oxygen molecules or because of other impurities in the hydrogen. In a Nickel Lanthanide metal hydride, the nickel content of the metal hydride alloy particles acts as a dissociation catalyst for hydrogen prior to absorption. The nickel can also act as a weak catalyst for dissociating water molecules. The resulting hydrogen may be absorbed into the alloy, but oxygen tends to react with the rare earth element (lanthanum or mischmetal) forming a stable oxide that is no longer available to hold hydrogen. Thus, a noble metal catalyst which reunites the oxygen molecules with ambient hydrogen molecules is an important addition to any water absorbing mixture which includes a metal hydride.

The invention has been described in connection with preferred embodiments. It will be understood that modifications may be made to the invention while retaining the general scope and teaching of the invention herein. The invention is thus understood to be limited only by the elements and limitations of the following claims.

What is claimed is:

1. In a thermal hydrogen compressor, a metal hydride material for retaining and storing a concentrated volume of hydrogen gas, said material being capable of repeatedly absorbing and discharging gaseous hydrogen, said material comprising a mixture of water vapor absorbing particles, metal hydride particles and a noble metal in powder form.

2. The metal hydride material of claim 1 wherein said noble metal in powder form further comprising of a metallic powder selected from the group consisting of: Platinum black, Palladium black and Ruthenium black.

3. In a hydrogen gas purifier for retaining and storing a concentrated volume of hydrogen gas, said material being capable of repeatedly absorbing and discharging gaseous hydrogen, said material comprising a mixture of water vapor absorbing particles, metal hydride particles and a noble metal in powder form.

4. The metal hydride material of claim 3 wherein said noble metal in powder form further comprising of a metallic powder selected from the group consisting of: Platinum black, Palladium black and Ruthenium black.

5. In a metal hydride air conditioner, a metal hydride material for retaining and storing a concentrated volume of hydrogen, said metal hydride material being capable of releasably absorbing and discharging gaseous hydrogen, said metal hydride material comprising a mixture of water vapor absorbing particles and metal hydride particles and further including an admixture of an additional powder noble metal in powder form.

6. The metal hydride material of claim 5 wherein said noble metal in powder form further comprises a metallic powder selected from the group consisting of: Platinum black, Palladium black and Ruthenium black.

7. In a metal hydride hydrogen storage device, a metal hydride material for retaining and storing a concentrated volume of hydrogen, said metal hydride material being capable of releasably absorbing and discharging gaseous hydrogen, and said metal hydride material comprising a mixture of water vapor absorbing particles and metal hydride particles, and further including an admixture of an additional noble metal in powder form.

8. The metal hydride material of claim 7 wherein said noble metal in powder form further comprises a metallic powder selected from the group consisting of: Platinum black, Palladium black and Ruthenium black.

9. A hydrogen compressor comprising an inlet for hydrogen gas fed at a low inlet pressure and an outlet for hydrogen gas at high pressure, having at least two sets of connected unit chambers and at least two heat exchangers for providing heat exchange between corresponding pairs of unit chambers, comprising:

A) a first unit chamber in communication with said inlet through a one-way valve adapted to admit hydrogen gas into said first chamber at a low inlet pressure, said chamber containing a first hydride material having an adsorption pressure below said low inlet pressure at a first temperature;

B) heat exchange means associated with said first unit chamber adapted to operate alternately to maintain said first unit chamber at or below said first temperature and to raise the temperature of said first unit chamber to a second temperature higher than said first temperature;

C) a second unit chamber in communication with said first unit chamber through a one-way valve adapted to prevent flow of hydrogen gas from said second unit chamber to said first unit chamber and containing a second hydride material forming a less stable hydride than said first hydride material and having a plateau pressure, at a temperature below said second temperature, less than the plateau pressure of said first hydride material at said second temperature;

D) heat exchange means associated with said second unit chamber adapted to operate alternately to maintain said second unit chamber at a temperature lower than said second temperature and at a third temperature higher than said first temperature;

E) a third unit chamber in communication with said second unit chamber through a one-way valve adapted to prevent flow of hydrogen gas from said third unit chamber to said second unit chamber and in communication with said outlet, said third unit chamber containing a third hydride material forming a less stable hydride than said second hydride material and having a plateau pressure, at a temperature below said third temperature, less than the plateau pressure of said second hydride material at said third temperature;

F) heat exchange means associated with said third unit chamber adapted to operate alternately to maintain said third unit chamber at a temperature lower than said third temperature and at a fourth temperature higher than said first temperature;

G) control means for alternating the temperature of said heat exchange means set forth in paragraphs B, D and F herein to maintain the lower of the two temperatures associated with any single chamber unit when hydrogen gas is being absorbed by the hydride material in said unit chamber and at the higher of the two temperatures when hydrogen is present in and being desorbed from the hydride material in said unit chamber; and H) said first unit chamber further including a hydrogen vent that is controlled by said control means for venting hydrogen gas from said first unit chamber at predetermined intervals and for a predetermined amount of time, wherein at least one or more metal hydride materials include a noble metal in the form of a metallic powder selected from the group consisting of: Platinum black, Palladium black and Ruthenium black.

10. In a device utilizing the application of heat to change the pressure of hydrogen gas within an enclosed container, wherein said enclosed container further comprises a metal hydride material for retaining and storing a concentrated volume of hydrogen gas, said material being capable of repeatedly absorbing and discharging gaseous hydrogen, and said material comprising a mixture of water vapor absorbing particles, metal hydride particles and a noble metal in powder form.

11. The metal hydride material of claim 10 wherein said noble metal in powder form further comprises a metallic powder selected from the group consisting of: Platinum black, Palladium black and Ruthenium black.

* * * * *